Jan. 18, 1955

L. E. SODERQUIST 2,699,572

TIRE VULCANIZING PRESS WITH AUTOMATIC BAGGING MECHANISM

Filed March 26, 1951

INVENTOR.
LESLIE E. SODERQUIST
BY
ATTORNEYS

Jan. 18, 1955 L. E. SODERQUIST 2,699,572
TIRE VULCANIZING PRESS WITH AUTOMATIC BAGGING MECHANISM
Filed March 26, 1951 10 Sheets-Sheet 3

INVENTOR.
LESLIE E. SODERQUIST
BY
ATTORNEYS

FIG. 4

INVENTOR.
LESLIE E. SODERQUIST
BY
ATTORNEYS

United States Patent Office 2,699,572
Patented Jan. 18, 1955

2,699,572

TIRE VULCANIZING PRESS WITH AUTOMATIC BAGGING MECHANISM

Leslie Edward Soderquist, Akron, Ohio, assignor to The McNeil Machine and Engineering Company, Akron, Ohio, a corporation of Ohio Application March 26, 1951, Serial No. 217,627

31 Claims. (Cl. 18—17)

The present invention relates to apparatus for shaping and vulcanizing tires made on flat building drums. Presses of this type were perfected by the present inventor and practical embodiments thereof are shown in prior Patents Nos. 2,495,663 and 2,495,664, issued January 24, 1950. Since the perfection of these presses, the operation thereof has become well known to the art and need not be described in detail.

The press shown and described herein is more particularly an improvement upon that shown in prior Patent No. 2,495,664, much of the mechanism which is employed in the said prior patent being duplicated herein and hence is shown only in such detail as is necessary for an understanding of the present invention.

In all presses of this type, the uncured tire band as it comes from the building drum is telescoped over the diaphragm, or "bag" as it is more commonly called, with the lower bead in its seat in the lower or stationary mold section. The press is now started on its closing movement and as the upper mold section comes in contact with the ring holding the upper edge of the diaphragm, the upper edge of the tire band is seated in the upper mold. The continued lowering of the upper mold section is accompanied by the inflation of the diaphragm and the joint operation shapes the tire band and causes it to assume the finished tire shape in which it is vulcanized in the closed mold.

Figure 3:
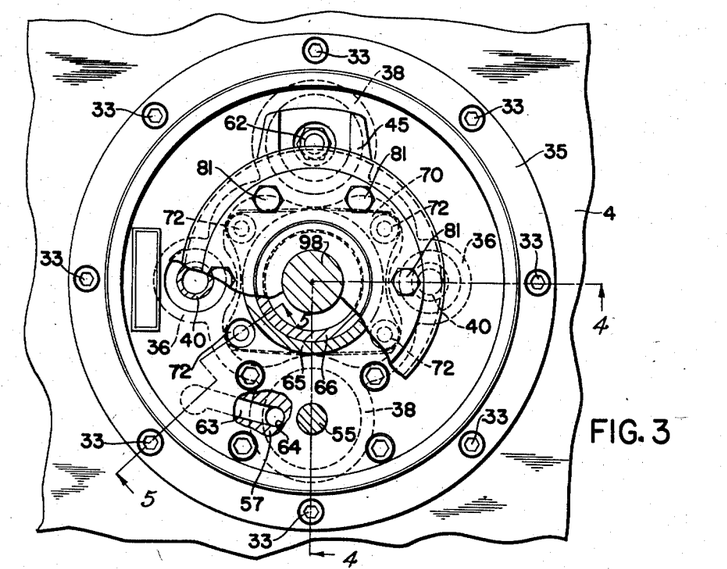
Fig. 3 is a view, one part of which is looking down on the top of lower diaphragm holding ring and the other in section as shown by the line 3—3 of Fig. 4.

In the manufacture of tires such as used for automobiles and small trucks, the drum is substantially flat, that is to say, the shoulders to receive the beads are set in from the main surface of the tire building drum a relatively short distance. Hence, the width of the diaphragm in cylindrical or collapsed condition is substantially the same as the overall width of any typical tire band to be cured thereon. This is shown in Fig. 3 of my prior Patent No. 2,495,663.

However, in the building of very large tires, such as used on extremely heavy trucks and vehicles requiring large wheel diameters, and in the making of tires in which great carcass strength and, hence, many plies are required, it is common to employ deep bead seats on the tire building drums. The diameters of the bead seats may be several inches less than the diameters of the main tire building surface. This will create a situation in which the total surface of the tire band from bead to bead is much greater than the straight line distance across the tire band from bead to bead.

The result of this condition is that the diaphragm, which must have a width equal to the surface on the inside of the tire band, projects a substantial distance above the uncured tire band when it is put in place in the press.

If the principles of my prior patents and of bagging and curing as exemplified therein are to be applied to situations of this character, it is necessary to make provision for the extensive projection of the diaphragm above the uncured band. If the press were to be closed directly upon the diaphragm in extended position, the extended portion of the diaphragm would tend to buckle outwardly over the upper edge of the tire band, pinching the diaphragm between the upper mold and the tire band. The resultant disastrous results are readily foreseeable.

It is the object of the present invention to incorporate with a tire press of the permanent diaphragm type, mechanism to take care of situations such as described above. While the principles of the present invention may be applied to other tire vulcanizing presses of the diaphragm type, if and when they are perfected, the invention is shown as it has been adapted for and incorporated in presses made in substantial accordance with my prior Patent No. 2,495,664.

It is essential that the diaphragm be in cylindrical or substantially cylindrical shape in order to place the uncured tire band thereover. After the band is in place and the press started on its closing movement the first operation is to contract the diaphragm axially so as to bring the upper edge of the diaphragm down to the level of the upper beaded edge of the tire band. The approach of the two diaphragm holding rings or closures places the diaphragm in position for the subsequent inflation of the diaphragm and the shaping of the tire band and the curing of the tire.

The axial contraction of the diaphragm is completed before the upper half of the mold contacts the upper diaphragm holding ring. Thereupon, the balance of the closing operation takes place as in my prior patent.

On the opening of the press, the operations are the same as in my prior patent except that special provisions are necessary to insure the complete axial elongation of the diaphragm.

A further object of the invention is to improve upon the means shown in my prior patent for raising the cured tire and diaphragm out of the lower mold section at the end of the vulcanizing period, at which time the press is opened.

The press shown and described herein has the same tire supporting arms of my prior patent and these parts are shown only to the extent to which it is necessary for an understanding of this invention. The drive mechanism for opening and closing the press and the special toggle mechanism, which is one of the features of prior Patent No. 2,495,664, are incorporated herein but are not shown and described except as essential for the purposes of this case.

The specific embodiment of the invention is shown as a dual or twin press but may be adapted to a single press. In the drawings, only one side of a dual press is shown, it being understood that the mechanism is duplicated on the other side of the press.

Many of the details of the mechanism may be altered or improved upon without changing the essential features of the invention which is shown and described herein in its best known and preferred form.

In the drawings, the uncured tire band is given the reference letter A and the beads are given the reference letter B. It will be noted that the beads are set far in from the inner surface of the band for the reasons stated. The cured tire is given the reference letter T.

Press construction and operation

The press shown herein is carried upon a plurality of vertical plates indicated by the numeral 1. These plates are generally L-shaped, having raised portions 2 at the rear of the press which house the operating and driving mechanisms. The forward portions of the plates are reduced in height, as shown at 3, and on these reduced portions is mounted the base plate 4 which supports the lower halves of the molds and is adequately braced by a plurality of I-beams 6 to withstand the immense pressure exerted upon it. The mold machine is connected to a bed plate 7. Additional vertical plates 8 are located at required points to complete the framework of the press.

As explained above, the press shown herein is a dual or twin press and each base plate 4 is provided with two annular raised flanges 10, each to position a lower mold section 12. Each flange surrounds an opening 13 in which are received the operating machanisms for the diaphragm.

Each upper mold section 14 is carried upon a cross piece 15 which is journaled on one element 16 of a toggle mechanism, the other element of which is constituted by the swinging main links 18, which are pivoted to the base of the press, all as described in my prior patents. The upper mold sections are guided in the straight line paths required of them by the guide links 20 and the toggle mechanism is actuated by the links 22 which extend from the upper ends of links 18 to planetary gears or disks 24 carried on the main driving gears 25. The gears 25 are mounted upon shafts 23 and are driven by pinions 26 keyed to the main drive shaft 28 which, being mounted in bearings 29 in the vertical plates 1, extends across the machine. It is necessary to state here only that the upper platen operating mechanism gives a long range of opening and closing movement while the upper and lower mold sections are in parallelism, so that the upper mold section acts upon the upper diaphragm holding ring to force the two rings together during the closing of the mold and also gives an extensive direct vertical movement to strip the tire from the mold and then strip the diaphragm from the tire. During the closing of the press, the gear 25 moves in the anti-clockwise direction, as shown by the arrow in Fig. 9, and reverses for the opening movement of the press.

The diaphragm carrier

Figures 1, 7A:
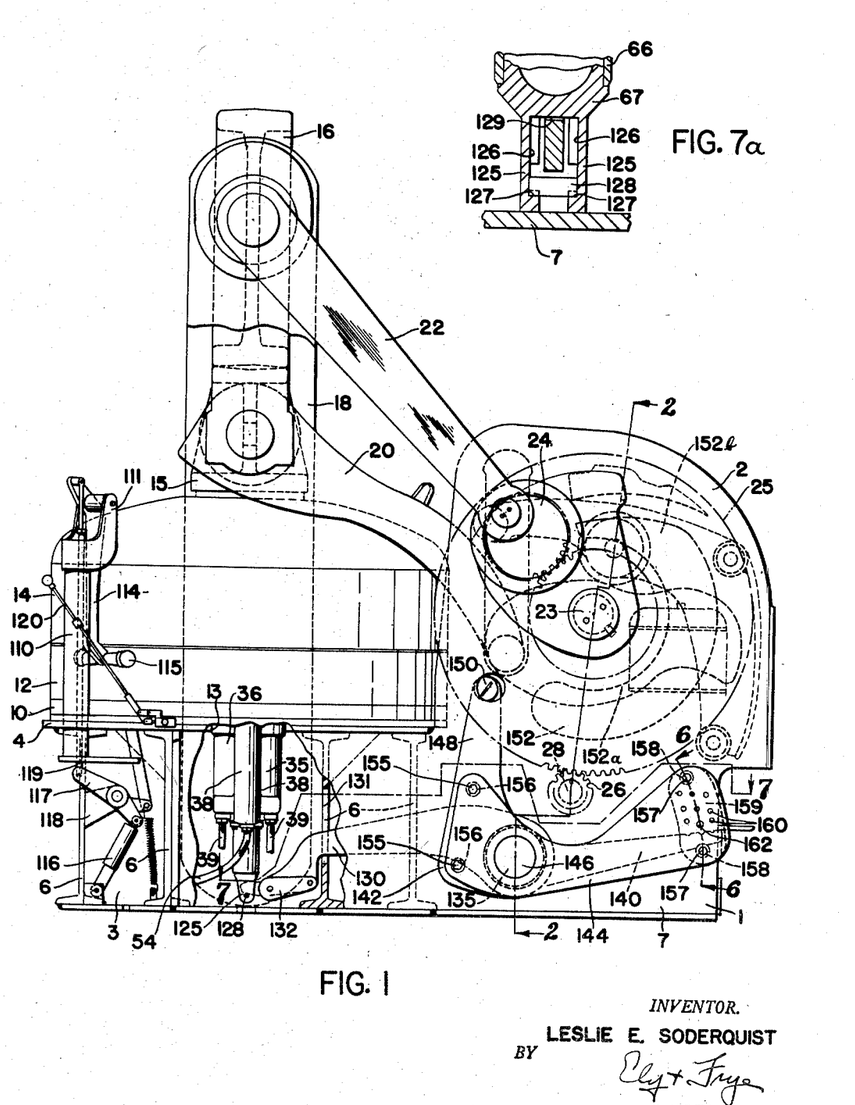
Fig. 1 is a side elevation of a tire shaping and vulcanizing press of the improved design.
Fig. 7a is a detail section on the line 7a—7a of Fig. 4.

Located at the center of each mold and secured by bolts 33 on a ledge 32, surrounding the opening 13 in the base plate 4, is a cylinder block which is given the numeral 35. Formed in this block are two relatively small cylinders 36 located diametrically apart and midway between these cylinders 36 are two larger cylinders 38. The position of the cylinders 36 and 38 is usually as shown in Figs. 1 and 3, but for the sake of showing the press operations more clearly they are shown in the majority of the views with the larger cylinders 38 arranged in a line at right angles to the showing in Figs. 1 and 3. The lower end of the block is provided with a vertical passage 37.

Figure 4:
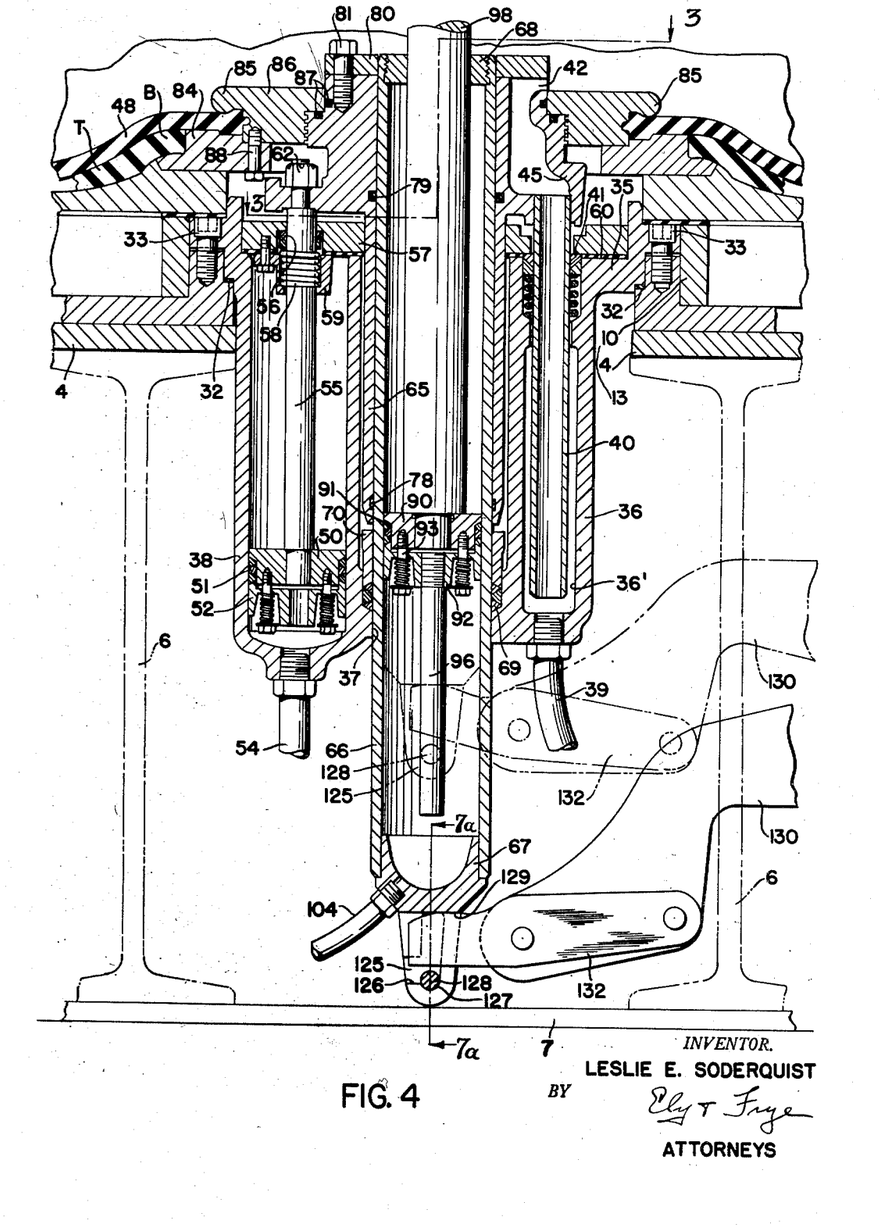
Fig. 4 is a vertical section through the base of the press at the axis of the diaphragm on the line 4—4 of Fig. 3.

The smaller cylinders 36 receive the diaphragm inflating and heating medium, which is usually steam under high pressure. Whatever medium is used enters into and leaves the diaphragm through the cylinders 36' by the piping 39. Telescoped in each cylinder 36 is the pipe 40 which slides through the spring held packing gland 41 and is connected at its upper end to a passage 42 formed in the upper end of a diaphragm carrier 45, to which the lower edge of the diaphragm 48 is secured. The passages 42 communicate with the interior of the diaphragm 48, as shown at the top of Fig. 4.

The cylinders 38 are for the purpose of raising the carrier 45 of the diaphragm assembly. For this purpose in each cylinder is located a piston 50 which is sealed against the interior of the cylinder by a gasket 51 held under compression by the spring pressure plate 52. Pipes 54 conduct pressure into and out of one end of the cylinders 38. The piston rod 55 extends through a packing 56 located in the underside of a cover plate 57, which lies over the top of the cylinder block. A coil spring 58 held in a cap 59, secured to the plate 57, maintains pressure on the packing. As seen in Fig. 4, the cover plate also holds in position the packings 41 at the top of the cylinders 36. A sealing gasket 60 is placed between the cover plate and the top of the cylinder block.

Figure 5:
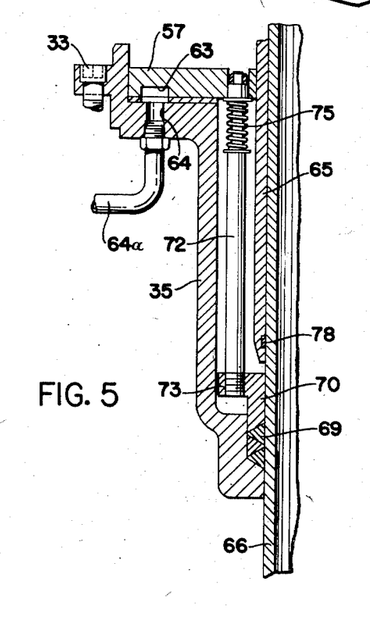
Fig. 5 is a section on the line 5—5 of Fig. 3.

The piston rods 55 are shouldered at their upper ends and the reduced and threaded portions pass through the carrier 45, which is held on the rods by the nuts 62. Pressure is conducted into the upper ends of cylinders 38 through passages 63 cut in the underside of the cover plate 57 and communicating with passages 64 in the flange of the cylinder block to which are connected the pipes 64a (Fig. 5).

From the center of the carrier 45 and extending into the cylinder block between the cylinders 36 and 38 is a sleeve 65 which is a continuation of a central passage in the carrier and in which is located a long cylinder 66, the lower end of which is closed by a cap 67 and the upper end by a threaded disk 68.

The cylinder 66 is slidable in the passage 37 at the base of the cylinder block. This passage is sealed by the packing 69 held under compression by a ring 70 (Fig. 5), which is forced against the packing by long rods 72, the lower ends of which are threaded into lugs 73 located at spaced points about the ring 70. The rods 72 are forced downwardly by springs 75 located between shoulders near the tops of the rods and the underside of the cover plate 57.

The cylinder 66 is movable in the diaphragm carrier 45 and its sleeve 65, a packing ring 78 being located at the lower end of the sleeve 65 and an O-ring 79 near the top of the passage. A cap ring 80 held by bolts 81 closes the crack around the top of the passage through which the cylinder 66 may move.

The lower edge of the diaphragm 48 is clamped between a ring-shaped plate 84, which seats in the lower mold section, and the overhanging flange 85 of a ring 86 threaded on the carrier 45. O-rings 87 seal and the space between the ring 86 and the main body of the carrier. When the ring 86 has been threaded in place to grip the lower edge of the diaphragm, the parts 84 and 86 are clamped together by the bolts 88. That part of the plate 84 which underlies the bead of the tire serves to lift the tire out of the mold when the press is opened.

Located in the central cylinder 66 is a piston 90 held in close sealing engagement with the cylinder by the packing 91 which is compressed by the spring loaded disk 92 carried on bolts 93 from the piston. Threaded in the disk 92 is a rod 96 which acts as a safety stop to limit the extent of downward movement of the piston.

Figure 10:
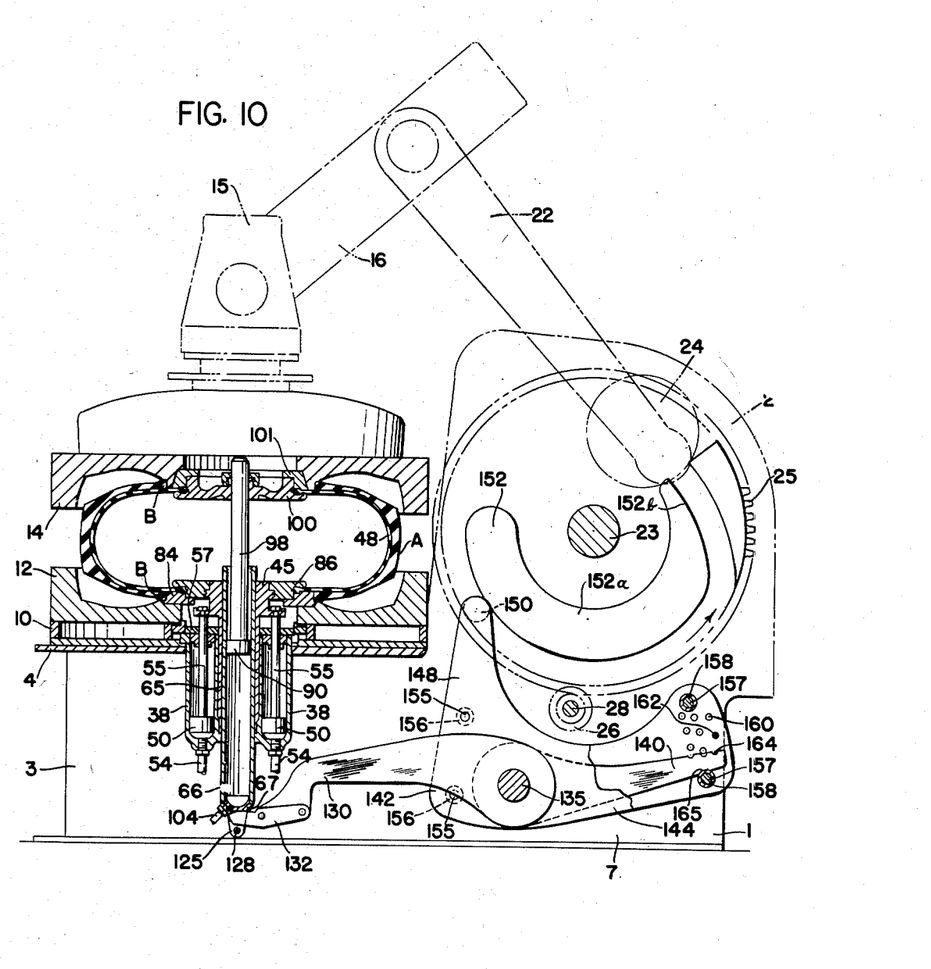
Fig. 10 shows the press partially closed.

Set in the upper side of piston 90 is the long vertical shaft 98 which serves as the support for the upper diaphragm plate 100. This shaft has a sliding fit in the disk 68 and at its upper end is fixed the upper diaphragm closure or supporting plate 100 to which the upper edge of the diaphragm is clamped by the ring 101. The details of this upper diaphragm supporting plate are shown in my prior Patent No. 2,495,664, it being sufficient to state that the outer surface of the ring 101 is beveled to fit a correspondingly beveled surface 102 on the upper mold as the press closes. When the upper mold strikes the ring 101, it has begun its straight line movement and the continued closing of the press is on that line, as shown in Fig. 10. The piston 90 is projected outwardly of the cylinder 66 by fluid pressure admitted into the base of the cylinder through the pipe 104 set in the cap 67.

Résumé of diaphragm carrier movements

It will be seen from a comparison of the several views illustrating the various positions of the diaphragm that the diaphragm carrier is capable of a wide range of positions. Thus in Fig. 8, where the diaphragm is extended to its full length, the piston 90 is at the top of the cylinder 66, the pistons 50 are at the bottoms of the cylinders 38, and the lower diaphragm carrier 45 is seated in the lower mold.

Figure 6:
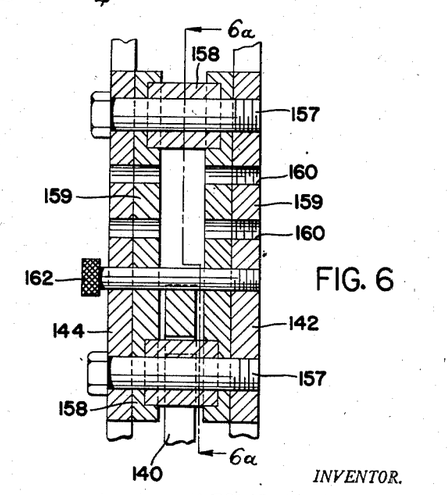
Fig. 6 is a section on the line 6—6 of Fig. 1.
Figures 6A, 9:
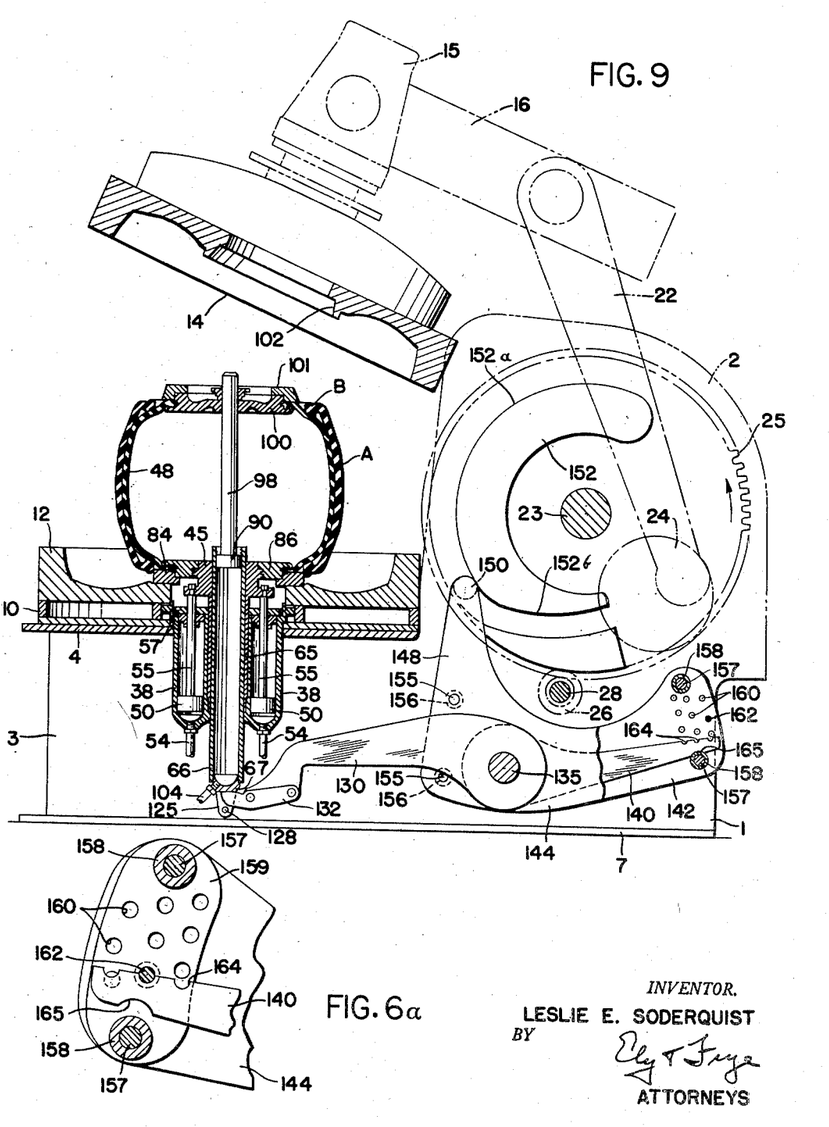
Fig. 6a is a section on the line 6a—6a of Fig. 6.
Fig. 9 is a view similar to Fig. 8, but showing the first stages of the closing operation in which the upper half of the mold has started downwardly and the diaphragm has been axially contracted so as to insure that it will properly seat with the tire band.
Figure 7:
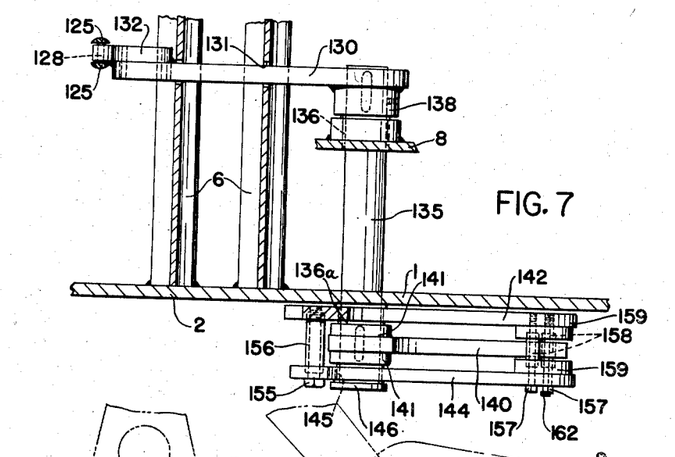
Fig. 7 is a section on the line 7—7 of Fig. 1, showing a plan view of the lever mechanism for actuating the diaphragm carrier.

The next phase in the operation, after the tire band A has been set in place with its lower bead resting in the mold, is the downward withdrawal of the cylinder 66 through the cylinder block 35 while the piston is fully distended in the cylinder 66. This operation is performed by the closing of the press and through mechanism which will be described, attention being directed to the downward extension of the cylinder 66, below the cylinder block, as shown in Fig. 9.

It will be seen that the cylinder 66 and the shaft 98, in fact, constitute a telescoping shaft for supporting the upper diaphragm plate 100 and that this shaft has a movement independent of the lower diaphragm support.

The downward movement of the cylinder 66 and the shaft 98 carries the upper diaphragm holding plate to the level of the top of the upper bead and is the feature which insures the proper seating of the diaphragm in the tire band. The withdrawal of the plate 100 serves to reduce the volume of the space enclosed by the diaphragm and the resultant displacement of the air will cause the diaphragm to belly outwardly slightly, which assists in the proper seating of the diaphragm in the band. During the initial axial contraction of the diaphragm, no fluid under pressure is admitted to the diaphragm so that there is no tendency for the diaphragm to extend out over the top of the tire band. After the upper diaphragm closure has reached the level of the upper bead, a slight additional pressure may be introduced into the diaphragm to assist in the initial seating operation.

It will be seen that the extent of travel of the upper diaphragm plate 100, to bring it level with the upper edge of the tire band A, will vary with different sizes of tires and provisions are made for adjustment to suit various sizes of tires. It will be further noted that in dual presses the adjustment for each mold is made separately from the adjustment for the other mold, so that two different sizes of tires may be cured on the same press at the same operation.

Figure 11:
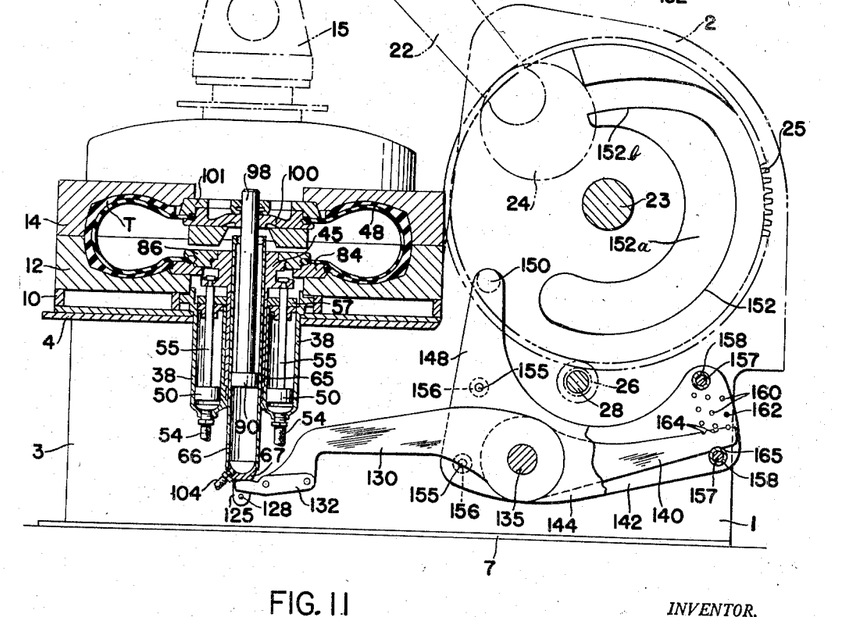
Fig. 11 shows the press fully closed.

The closing movement of the press is as shown in Figs. 10 and 11, the former showing the retreat of the upper diaphragm plate 100 and the telescoping of the piston 90 in the cylinder 66 as the press closes. The latter shows the mold closed, as during the cure. During all of this time the pistons 50 have been at the bottom of cylinders 38. During the final shaping of the band and then during vulcanization the pressure and heating fluid has been circulating at sufficient pressure to shape and cure the tire through the diaphragm by way of the cylinders 36. The operation of the pressure medium is time controlled and when the cycle is completed the pressure within the diaphragm is released and the press opens automatically.

Figure 12:
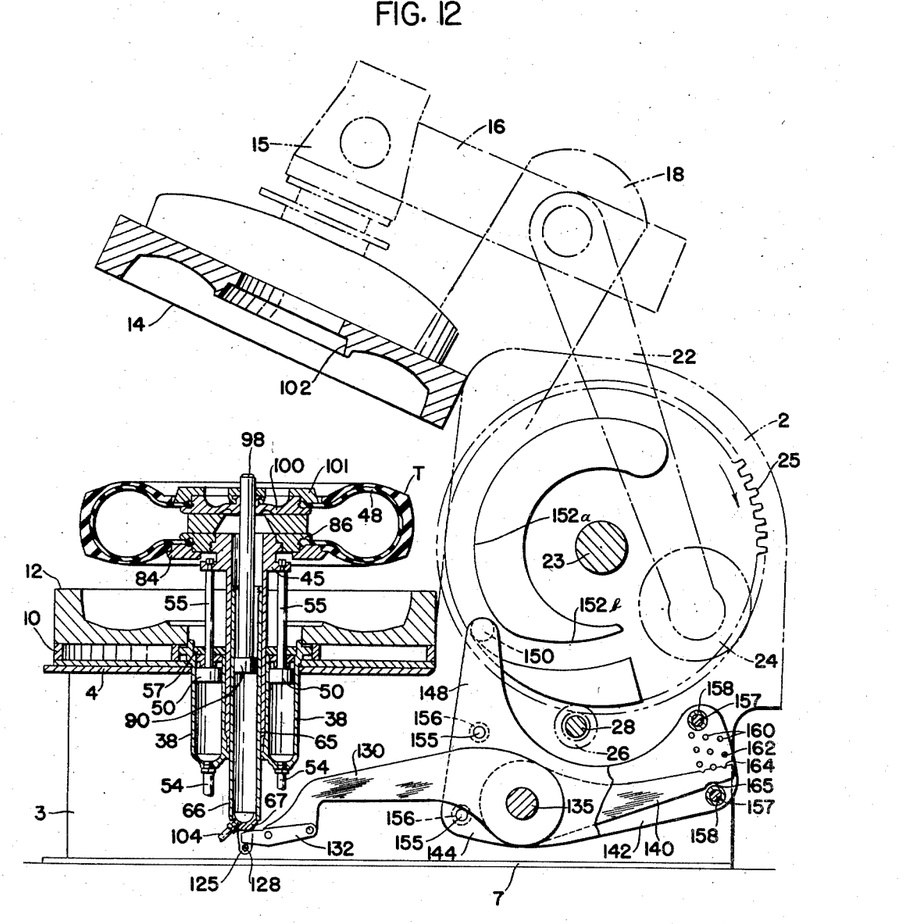
Fig. 12 shows the press on its opening movement, the tire and diaphragm being lifted entirely out of the lower mold section.

After the vulcanization is completed, the press is opened by the reverse rotation of the gear 25 in the clockwise direction, raising the upper mold section clear of the tire, as shown in Fig. 12. The first operation after the press opens is the lifting of the entire diaphragm assembly to strip the vulcanized tire T and the diaphragm out of the lower half of the mold. This is done by injecting fluid pressure into the lower part of the cylinders 38, which forces the pistons 50 upwardly, raising the lower diaphragm carrier 45 which lifts the upper diaphragm plate 100. This operation carries with it the piston 90.

Figure 13:
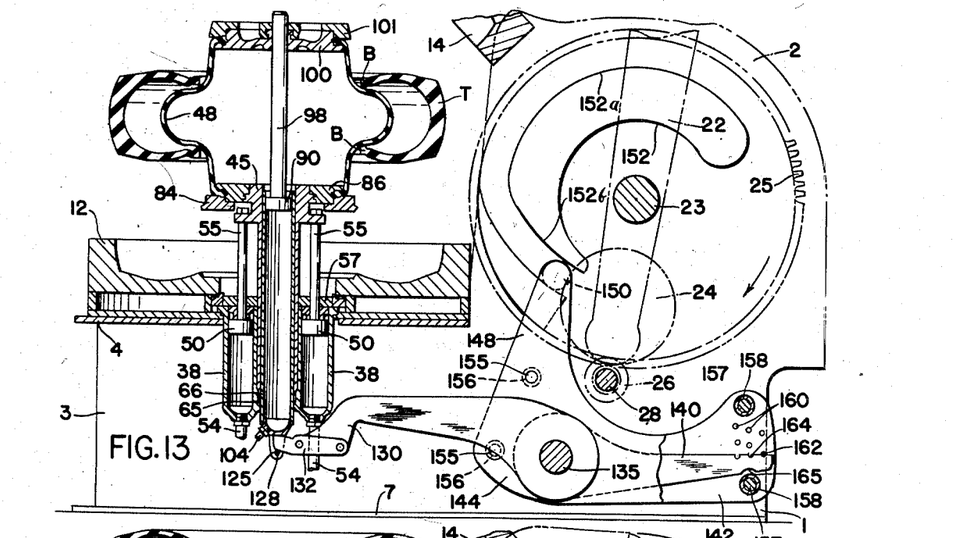
Fig. 13 shows the diaphragm partially stripped from the tire.

The next operation is to strip the diaphragm from the interior of the tire and this is performed in several stages, the first of which is shown in Fig. 13. Immediately after the pistons 50 raise the diaphragm assembly as shown in Fig. 12, the continuing opening movement of the press through mechanism to be described acts on the cylinder 66 to raise it bodily through the cylinder block. At the same time, the pressure within the cylinder 66 projects the piston to the outer end of the cylinder. As the lower diaphragm carrier is not moved, this action starts the axial elongation of the diaphragm, which initiates its withdrawal from the tire, as shown in Fig. 13.

The upward movement of the diaphragm tends to carry the tire with it, but at this time the tire supporting means comes into play.

Figure 8:
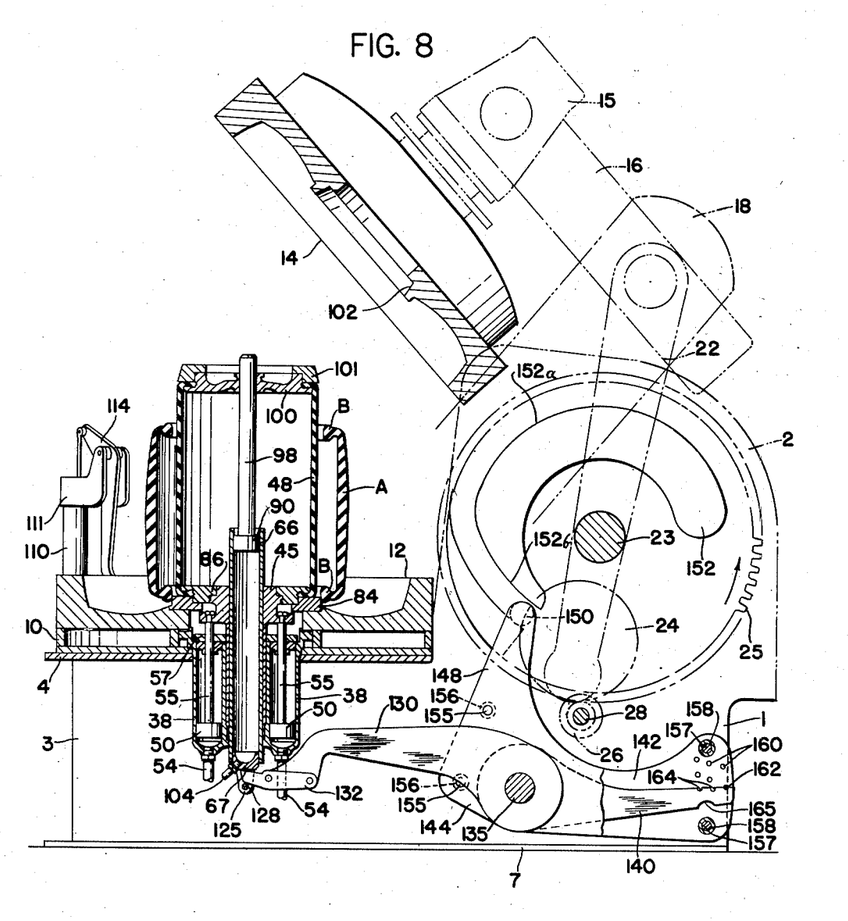
Fig. 8 is a vertical section through the front part of the press showing the mold fully opened and a deep-beaded tire band in place over the diaphragm, which projects as noted above the upper edge of the tire band for a substantial distance.
Figure 14:
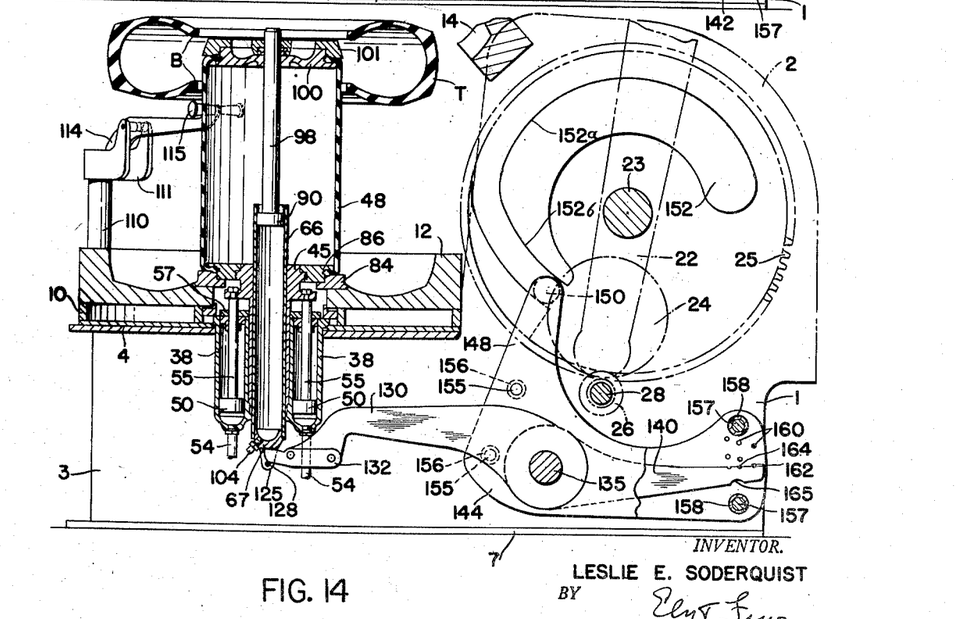
Fig. 14 shows the press fully opened and the diaphragm completely stripped from the tire.

The tire supporting means is fully shown in my prior Patent No. 2,495,664 and is shown here only in such detail as may be necessary in Figs. 1, 8, and 14. They are omitted from the other views to avoid confusion. As shown in the prior patent there are two tire supporting arms located in diametrically opposed positions across the press. Each arm is carried on a stanchion 110 located at the side of the mold, the upper end of which carries a bracket 111 in which the arm 114 is pivoted. The outer end of arm 114 carries a broad roller 115 adapted with its companion roller to form an adequate support for the tire during the diaphragm stripping operation and until the finished tire is removed from the press.

Normally, these arms 114 hang idly by the side of the press, out of the way, but as the operation shown in Fig. 13 takes place, the arms 114 swing to the position shown in Fig. 14 and support the tire during the balance of the stripping operation. The arms are moved through cylinders 116, acting on levers 117 pivoted on brackets 118 in the lower part of the press. Links 119 connect the levers 117 with the outer ends of the arms 114. The operation of the cylinders 116 is automatically controlled. After the tire has been removed from the arms, they may be lowered by a hand release 120, all as described in my former patent.

The arms 114 not only engage the tire but they actually raise the tire somewhat to assist in the stripping operations, as may be seen by a comparison of the positions of the tire in Figs. 13 and 14. During the last stripping operation, fluid pressure is admitted to the tops of the cylinders 38, driving the pistons 50 downwardly, completing the axial elongation and stripping of the diaphragm and seating the lower diaphragm carrier in its position in the lower mold. The parts are now in the position shown in Fig. 8, ready to receive a new tire band.

*Mechanism for raising and lowering the cylinder 66*

As has been noted, the cylinder 66 has movement in unison with the balance of the diaphragm operating mechanism and it also has movement independent thereof. In order to take care of various sizes of tires requiring differing widths, its movement has to be regulated. The movement of the cylinder is done through lever mechanism actuated in timed relation to the opening and closing movements of the press.

The cap 67 at the lower end of the cylinder 66 is provided with two downwardly extending, spaced, parallel arms 125, the opposing faces of which are formed with oppositely facing L-shaped slots 126, the lower ends of which open to one side of the arms. At the angles of the slots are two shallow recesses 127 and in these recesses may be inserted the transverse bearing pin 128. The lower side of the cap 67 also provides a bearing surface 129 opposed to the pin 128. This provides a space to receive the operating end of the lever for raising and lowering the cylinder 66.

The lever which performs this operation is indicated by the numeral 130. At its outer end it projects through slots 131 in the interposed I-beams 6 and is bent downwardly and to its lower, outer extremity is pinned and welded a long narrow operating plate 132, the extremity of which extends between the arms 125 and between the pin 128 and the surface 129. The upper surface of the plate 132 is rounded so as to make a rolling bearing against the cap 67. It will be seen that the vertical movement of the lever 130 imparts vertical movement to the telescoping shaft, consisting of the cylinder 66 and the shaft 98 telescoping therein. The range of movement is shown by the full and dotted line positions in Fig. 4.

Figure 2:
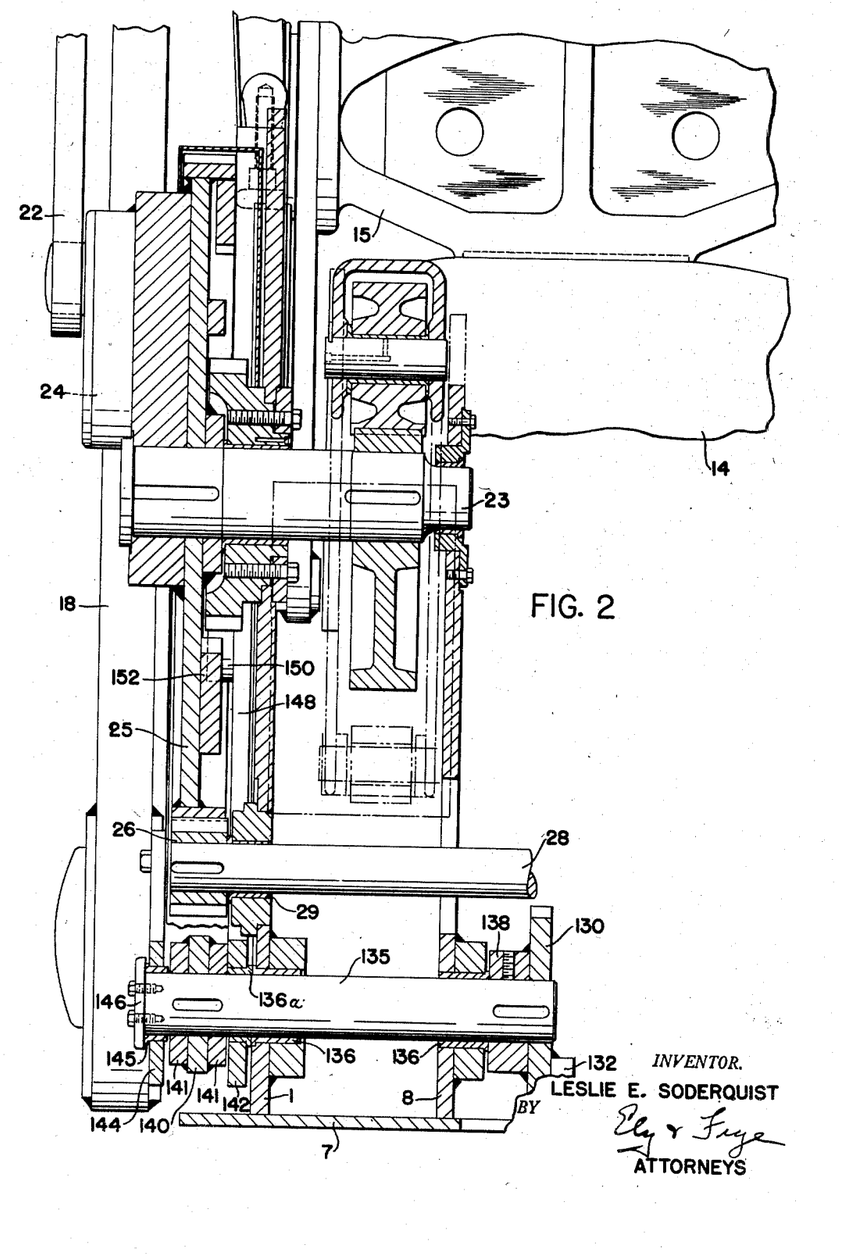
Fig. 2 is a section through one side of the press, the section being taken on the line 2—2 of Fig. 1.

At its inner end, the lever 130 is mounted on a shaft 135 which is rotatable in bearings 136 in the plates 1 and 8 (Fig. 2). It will be noted that this shaft 135 is confined to one side of the press only so as to serve one mold only, a companion shaft being located on the other side of the press to serve the other mold. This is so that the independent adjustments may be made for each mold.

The lever 130 is welded to a collar 138 which is keyed to the shaft 135. Shaft 135 extends outwardly of the side plate 1 to a position below the operating gear 25 and at this point is located a second lever arm 140 which is in effect a rigid extension of the lever 130 as it is keyed to shaft 135 and welded to two collars 141, likewise keyed to shaft 135.

The lever arm 140 is flanked on either side by a dual operating lever composed of two parts or lever arms 142 and 144. These arms are rotatable upon the shaft 135, the former on a bearing sleeve 136a and the latter on a bushing 145 held in place by a cap plate 146 secured to the end of shaft 135. Over the major part of their surfaces, the two levers 142 and 144 are the same but the lever 142 has an upward extension 148 which reaches to a point within the perimeter of the operating gear 25. At this point the lever 142 is provided with a roller 150 which extends toward the side face of the gear 25 to engage a cam track formed therein. The cam track is indicated by the numeral 152 and its contour appears in many of the figures. It is characterized by a generally concentric portion 152a lying close to the perimeter of the gear and with a second portion 152b which approaches the center of the gear.

When the press is fully opened, as shown in Fig. 8, the roller 150 is at the extreme inner end of the section 152b of the cam and hence the cylinder 66 is raised to its extreme upper position. As the press starts to close, the roller 150 moves down the cam track section 152b and lowers the cylinder 66 to the position shown in Fig. 9, where it remains during the balance of the closing operation, as shown in the other views. During opening, the roller 150 does not act to raise the cylinder 66 until near the end of the opening movement, where, as shown in Fig. 12, the roller 150 is about to enter the portion 152b of the cam track.

Returning now to the levers 142 and 144: As noted above, except for the operating extension 148 on the lever 142, these two levers are substantially the same shape and are located on opposite sides of the lever 140 which moves between them. The levers 142 and 144 are held in spaced parallel relation by upper and lower bolts 155 and spacer sleeves 156 at the front of the levers. At the rear they are held in spaced parallel relation by bolts 157 and spacer sleeves 158.

As will be seen from the description, the two lever combinations, one comprising the lever arms 130 and 140 and the other the lever arms 142 and 144, have the capability of relative rotatable movement and the lever combination 130—140 follows the movements imparted to the lever combination 142—144 only to the extent that the two units are compelled to move in unison.

The above is the means by which the press is adapted to handle different sizes of tires requiring different degrees of diaphragm contractions to insure the proper seating of the diaphragm. Also, because the mechanism which is now being described is individual for each side of the press, different sizes may be cured at the same time in one press.

The tail of the lever arm 140 extends to the corresponding ends of the levers 142 and 144 and lies between the spacer sleeves 158. At this point, the levers 142 and 144 are provided with a pair of spacer plates 159. Extending through the lever arms 142 and 144 and the plates 159 are a plurality of sets of oppositely located holes carefully spaced apart and graduated to different widths of diaphragms. These holes are indicated by the numeral 160, and through any pair of holes is placed a stop pin 162. The degree of movement of the lever combination 130—140, relative to the lever combination 142—144, is dependent upon the location of the pin 162. When the press is fully opened as in Fig. 8, the height of the upper diaphragm ring 100, which is fixed by the width of the diaphragm, is determined by the location of the pin 162. The location of this pin also determines the extent of lost motion between the lever combinations 130—140 and 142—144. As the press starts to close, the lower sleeve will strike the lower side of the lever arm 140 after the predetermined interval and as the press nears its open position the lever arm 140 will be struck by the pin 162. After either occurrence, continued movement of lever mechanism 142—144 moves the lever mechanism 130—140, thus raising or lowering the cylinder 166.

Thus, in Fig. 6a, the pin 162 is in contact with one of the notches 164 on the upper side of the lever 140 and as the gear 25 revolves in press closing movement there will be a brief moment before the notch 165 on the underside of the lever comes in contact with the sleeve 158, but, thereafter, the two lever combinations will move as a unit. It will thus be seen that by properly locating the pin 162 in any selected pair of holes 160, the extent to which the upper diaphragm plate is moved before the upper mold section comes into play can be regulated and determined.

On the return or opening movement, the roller 150 rides in the section 152a of the cam until the diaphragm assembly is raised out of the lower mold section, which is the condition of Fig. 12, whereupon roller 150 enters the section 152b, which rocks the compound levers 142—144 to bring the pin 162 in contact with the upper side of lever 140, and continued movement of the gear 25 elevates the cylinder 66, as shown in Fig. 13. The downward movement of the pistons 50 in cylinders 38 completes the stripping of the diaphragm.

Conclusion

It is believed that the operation of the press will have been made clear by the foregoing. The principles of the prior developments in presses for the shaping and curing of automobile tires from flat band built carcasses have been retained, but the press has been adapted for the shaping and curing of tires with deep bead seats that could not be handled in prior presses because of the amount the diaphragm extends beyond the limits of the uncured band.

So far as known, the present press is the first one which has been designed by which tires of the type specified can be cured in diaphragm presses. As such, the invention is entitled to a range of equivalents commensurate with the scope of the invention and is not to be confined to details of the construction which have been illustrated.

The several press operating means are not shown for there is nothing novel in those parts, the trade being familiar with this type of press and, furthermore, the mechanism is all fully described in prior patents. The sequence of operations are all controlled by practical timing mechanism, with which this art is thoroughly familiar.

The invention is applicable to any type of press in which a permanent diaphragm is employed in lieu of the older air bag system. The invention represents a further step forward in the perfection of tire vulcanizing equipment which makes the old expensive and cumbersome air-bag system out of date.

While the invention is shown in a press in which the lower mold is stationary and the upper mold moves, it is not necessarily limited to that type of press and, while for the sake of simplicity and directness, the stationary mold section will be referred to in certain claims as the lower mold section and the movable section as the upper section, those terms are relative only for the relation of the sections may be reversed without affecting the operation of the invention in any way.

What is claimed is:

1. In a tire band shaping and vulcanizing press having relatively movable mold sections, a diaphragm located between the mold sections, a closure for one end of the diaphragm, means for supporting the diaphragm with the closure located outside of the tire band and in the path of a movable mold section, means to bring the closure to the approximate plane of the edge of the tire band at the beginning of the press closing movement and prior to the contact of the movable mold member with the closure, and means to cause the movable mold section to contact the closure before the mold sections come together about the shaped tire band.

2. In a tire band shaping and vulcanizing press having upper and lower relatively movable mold sections, a diaphragm located between the mold sections, a closure for the upper end of the diaphragm, means for supporting the diaphragm with the closure thereof in the path of the upper mold section and above the upper edge of the tire band which surrounds it, means connected to the closure and operative at the beginning of the press closing movement to lower the closure to the approximate plane of the upper edge of the tire band before the upper mold section contacts the closure on the upper edge of the tire band, and means to cause the upper mold section to contact the closure before the mold sections come together about the shaped tire band.

3. In a tire band shaping and vulcanizing press having relatively movable mold sections, a diaphragm located between the mold sections, the width of said diaphragm exceeding the width of the tire band surrounding it, means to support one edge of the diaphragm in substantially the plane of one edge of the band and with the other edge of the diaphragm projecting beyond the other edge of the tire band and in the path of a movable mold section, means acting upon the projecting edge of the diaphragm at the beginning of the press closing movement to bring said edge to the approximate plane of the adjacent band edge before the movable mold section contacts the diaphragm, and additional means to cause the movable mold section to force the edges of the tire band together during the balance of the press closing movement.

4. In a tire band shaping and vulcanizing press having a lower mold section, an upper mold section and press closing means operative to rock the upper mold section into a plane parallel to the lower mold section and then to lower the upper mold section in a straight line toward and into contact with the lower mold section, a band shaping diaphragm having its lower edge in the approximate plane of the lower mold section, a closure for the upper edge of the diaphragm, means connected to the closure to support the closure in the path of the upper mold section during its straight line movement, and additional means operable during the rocking movement of the upper mold section to lower the closure a predetermined distance.

5. In a tire band shaping and vulcanizing press having a lower mold section, an upper mold section and press closing means operative to rock the upper mold section into a plane parallel to the lower mold section and then to lower the upper mold section in a straight line toward and into contact with the lower mold section, a band shaping diaphragm having its lower edge in the approximate plane of the lower mold section, a closure for the upper edge of the diaphragm, a rod connected to the closure and extending axially of the diaphragm to support the closure in the path of the upper mold section during its straight line movement, an operating arm connected to the rod, and means actuated during the rocking movement of the upper mold to move said arm to lower the closure a predetermined distance before the upper mold section reaches the closure.

6. In a press for shaping and vulcanizing tire bands, a lower mold section and an upper mold section, mechanism to move the upper mold section, a diaphragm and a diaphragm carrier located between the mold sections, said diaphragm carrier comprising a lower support attached to the lower edge of the diaphragm, a closure attached to the upper edge of the diaphragm, a telescoping shaft for supporting said closure, said telescoping shaft being movable as a unit axially of the carrier, and means to move the lower support along the telescopic shaft toward and from the lower mold.

7. In a press for shaping and vulcanizing tire bands, a lower mold section and an upper mold section, mechanism to move the upper mold section, a diaphragm and a diaphragm carrier located between the mold sections, said diaphragm carrier comprising a lower support attached to the lower edge of the diaphragm, a closure attached to the upper edge of the diaphragm, a telescoping shaft for supporting said closure, said telescoping shaft being movable as a unit axially of the carrier, means to move the lower support along the telescopic shaft toward and from the lower mold, and yielding means to expand the telescopic shaft.

8. A press for shaping and vulcanizing tire bands comprising a stationary lower mold section and an upper mold section movable toward and from the lower mold section, a diaphragm located between the mold sections, a lower diaphragm support attached to the lower edge of the diaphragm, and a plate attached to the upper edge of the diaphragm, a telescoping shaft connected to said plate, said telescoping shaft being movable axially of the lower diaphragm support and also contractible within itself, operating mechanism to move the upper mold section, a connection between the telescoping shaft and the said operating means to lower the telescoping shaft in the diaphragm support at the beginning of the mold closing movement, and means to contract the shaft upon itself during the shaping of the band.

9. A press for shaping and vulcanizing tire bands comprising a stationary lower mold section and an upper mold section movable toward and from the lower mold section, a diaphragm located between the mold sections, a lower diaphragm support attached to the lower edge of the diaphragm, and a plate attached to the upper edge of the diaphragm, a telescoping shaft connected to said plate, said telescoping shaft being movable axially of the lower diaphragm support and also contractible within itself, operating mechanism to move the upper mold section, a connection between the telescoping shaft and the said operating means to lower the telescoping shaft to a predetermined extent while the shaft is extended at the beginning of the mold closing movement, and means on the upper mold section to contact the plate and telescope the shaft upon itself during the shaping of the band.

10. A press for shaping and vulcanizing tire bands comprising a stationary lower mold section and an upper mold section movable toward and from the lower mold section, a diaphragm located between the mold sections, a lower diaphragm support attached to the lower edge of the diaphragm, and a plate attached to the upper edge of the diaphragm, a telescoping shaft connected to said plate, said telescoping shaft being movable axially of the lower diaphragm support and also contractible within itself, operating mechanism to move the upper mold section, and a connection between the telescoping shaft and the said operating means to lower the telescoping shaft to a predetermined extent before the upper mold section contacts the said plate, said telescoping shaft contracting upon itself during the shaping of the band to permit the two mold sections to close about the tire band.

11. A press of the type described in claim 9 in which there are located pairs of mold sections and in which the extent to which the shaft is lowered is variable independently in each mold.

12. In a press for shaping and vulcanizing tire bands, a lower mold section and an upper mold section, mechanism to move the upper section toward and from the lower section, a diaphragm and a diaphragm carrier located between the mold sections, said diaphragm carrier comprising a lower support attached to the lower edge of the diaphragm, a plate attached to the upper edge of the diaphragm, a telescoping shaft for supporting said plate, said telescoping shaft being movable as a unit axially of the carrier, reversible piston means to move the lower support along the telescoping shaft toward and from the lower mold, and fluid operated means to expand the telescoping shaft.

13. In a press for shaping and vulcanizing tire bands, a lower mold section and an upper mold section, mechanism to move the upper section toward and from the lower section, a diaphragm and a diaphragm carrier located between the mold sections, said diaphragm carrier comprising a lower support attached to the lower edge of the diaphragm, a plate attached to the upper edge of the diaphragm, a telescoping shaft for supporting said plate, said telescoping shaft being movable as a unit axially of the carrier, and reversible piston means to move the lower support along the telescoping shaft toward and from the lower mold, and means to expand or contract said telescoping shaft to cause the plate and the lower support to approach or recede from one another.

14. In a press for shaping and vulcanizing tire bands, a lower mold section and an upper mold section, mechanism to move the upper section toward and from the lower section, a diaphragm and a diaphragm carrier located between the mold sections, said diaphragm carrier comprising a lower support attached to th lower edge of the diaphragm, a plate attached to the upper edge of the diaphragm, a telescoping shaft for supporting said plate, said telescoping shaft being movable as a unit axially of the carrier, connections between the mechanism for moving the upper mold section and the shaft to lower the shaft before the upper mold section reaches the plate in its downward movement, reversible piston means to move the lower support toward and from the lower mold, and fluid operated means to expand the telescoping shaft.

15. In a press for shaping and vulcanizing tire bands, a lower mold section and an upper mold section, mechanism to move the upper section toward and from the lower section, a diaphragm and a diaphragm carrier located between the mold sections, said diaphragm carrier comprising a lower support attached to the lower edge of the diaphragm, a plate attached to the upper edge of the diaphragm, a telescoping shaft for supporting said plate, said telescoping shaft being movable as a unit axially of the carrier, connections between the mechanism for moving the upper mold section and the shaft to lower the shaft before the upper mold section reaches the plate in its downward movement, and reversible piston means to move the lower support toward and from the lower mold, said telescoping shaft being expansible and contractible to cause the plate and the lower support to approach or recede from one another.

16. In a press for shaping and vulcanizing tire bands, a lower mold section and an upper mold section, mechanism to move the upper mold section toward and from the lower mold section, a diaphragm and a diaphragm carrier located between the mold sections, said diaphragm carrier comprising a lower support attached to the lower edge of the diaphragm, a plate attached to the upper edge of the diaphragm, and located in the path of the upper mold section, a telescoping shaft supporting the plate, said shaft being movable axially of the diaphragm carrier, means to expand the shaft to space the support and the plate and elongate the diaphragm, and means operative prior to the contact of the upper mold section and the said plate to shift the shaft in the carrier to cause a partial approach of the plate and the support.

17. In a press for shaping and vulcanizing tire bands, a lower mold section and an upper mold section, mechanism to move the upper mold section toward and from the lower mold section, a diaphragm and a diaphragm carrier located between the mold sections, said diaphragm carrier comprising a lower support attached to the lower edge of the diaphragm, a plate attached to the upper edge of the diaphragm, a telescoping shaft supporting the plate, said shaft being movable axially of the diaphragm carrier, means to expand the shaft to space the support and the plate and elongate the diaphragm, and means to shift the shaft in the carrier to cause a partial approach of the plate and the support, said last named means comprising a movable arm connected to the shaft and means operated by the upper mold moving mechanism to move said arm at the beginning of the mold closing operation.

18. In a press for shaping and vulcanizing tire bands, a lower mold section and an upper mold section, mechanism to move the upper mold section toward and from the lower mold section, a diaphragm and a diaphragm carrier located between the mold sections, said diaphragm carrier comprising a lower support attached to the lower edge of the diaphragm, a plate attached to the upper edge of the diaphragm, a telescoping shaft supporting the plate, said shaft being movable axially of the diaphragm carrier, means to expand the shaft to space the support and the plate and elongate the diaphragm, and means to shift the shaft in the carrier to cause a partial approach of the plate and the support, said last named means comprising a rocking lever, one end of which is connected to the telescoping shaft and the other end of which is moved by the mechanism for operating the upper mold at the beginning of the mold closing movement.

19. In a press for shaping and vulcanizing tire bands, a lower mold section and an upper mold section, mechanism to move the upper mold section toward and from the lower mold section, a diaphragm and a diaphragm carrier located between the mold sections, said diaphragm carrier comprising a lower support attached to the lower edge of the diaphragm, a plate attached to the upper edge of the diaphragm, a telescoping shaft supporting the plate, said shaft being movable axially of the diaphragm carrier, means to expand the shaft to space the support and the plate and elongate the diaphragm, and means to shift the shaft in the carrier to cause a partial approach of the plate and the support, said last named means comprising a rocking lever, one end of which is connected to the telescoping shaft and the other end of which is moved by the mechanism for operating the upper mold at the beginning of the mold closing movement, and means to adjust the stroke of the lever.

20. In a press for shaping and vulcanizing tire bands, a lower mold section and an upper mold section, mechanism to move the upper mold section toward and from the lower mold section, a diaphragm and a diaphragm carrier located between the mold sections, said diaphragm carrier comprising a lower support attached to the lower edge of the diaphragm, a plate attached to the upper edge of the diaphragm, a telescoping shaft supporting the plate, said shaft being movable axially of the diaphragm carrier, means to expand the shaft to space the support and the plate and elongate the diaphragm, and means to shift the shaft in the carrier to cause a partial approach of the plate and the support, said last named means comprising a rocking lever, one end of which is connected to the telescoping shaft and the other end of which is moved by the mechanism for operating the upper mold at the beginning of the mold closing movement, and means operative independently of the said mechanism for varying the stroke of the lever.

21. In a press for shaping and vulcanizing tire bands, mating mold sections movable toward one another during the closing of the press, a diaphragm located between the mold sections, means for supporting one edge of the diaphragm at one of the mold sections, a closure for the other edge of the diaphragm, means for supporting the closure beyond the tire band so that a portion of the diaphragm projects outside of the tire band, means operative on the initial closing movement of the press to reduce the height of the diaphragm to approximately the height of the tire band, and additional means independent of said means and operative after the operation of the last named means for forming the diaphragm and the tire band simultaneously into tire shape with the tire seated in the closed mold.

22. In a press for shaping and vulcanizing tire bands, mating mold sections movable toward one another during the closing of the press, a diaphragm located between the mold sections, means to inflate the diaphragm, a telescoping shaft attached to the upper edge of the diaphragm, means to move the shaft bodily to a predetermined extent to reduce the height of the diaphragm before the diaphragm is inflated, and means operative thereafter to telescope the shaft upon itself during the closing of the press and the shaping of the tire band.

23. In a tire shaping and vulcanizing press having an expansible diaphragm about which a tire band is telescoped, an upper diaphragm closure plate attached to the upper edge of the diaphragm and a lower diaphragm ring attached to the lower edge of the diaphragm, a telescopic shaft attached to the upper diaphragm closure plate, said shaft being extensible by fluid pressure, an upper mold section and a lower mold section, said upper mold section being movable toward the lower mold section, the upper diaphragm closure plate being in the path of the upper mold section and moved thereby against the pressure in the telescopic shaft, means to move the telescoping shaft as a unit downwardly for a limited distance before the upper mold section contacts the upper diaphragm closure, and means operative independently of the telescopic shaft to raise and lower the lower diaphragm ring.

24. In a tire shaping and vulcanizing press having upper and lower mold sections, means to move the upper mold section toward and from the lower mold section, a diaphragm between the mold sections, an upper closure plate for the upper end of the diaphragm, a telescopic rod supporting the closure plate, pneumatically operated means to expand the rod, said closure plate being in the path of the upper mold section and depressed thereby against the pressure in the rod during the closing of the press, a ring attached to the lower edge of the diaphragm, means to move the telescopic rod as a unit axially of the ring at the beginning of the press closing movement and at the end of the press opening movement, and a fluid pressure cylinder connected to the ring and adapted to raise it above the lower mold to strip the vulcanized tire therefrom and to return it to the lower mold to strip the diaphragm from the tire.

25. In a tire shaping and vulcanizing press having upper and lower mold sections, a diaphragm and means for manipulating the diaphragm during the opening of the press comprising a closure plate attached to the upper edge of the diaphragm and a ring attached to the lower edge of the diaphragm, a telescopic rod connected to the closure plate and movable axially through the ring, pressure means communicating with the interior of the rod to expand it, a pressure cylinder attached to the ring and adapted to raise the ring to remove the tire from the lower mold section, means to admit fluid pressure to the telescopic rod and means to raise the rod as a unit to strip the diaphragm out of one side of the tire, and means to admit fluid pressure to the cylinder to depress the ring to strip the diaphragm out of the other side of the tire.

26. In a tire shaping and vulcanizing press having upper and lower mold sections, a diaphragm and means for manipulating the diaphragm during the opening of the press comprising a closure plate attached to the upper edge of the diaphragm, and a ring attached to the lower edge of the diaphragm, a telescopic rod connected to the closure plate and movable axially through the ring, fluid pressure means to expand the rod, lever mechanism operable on the opening of the press to raise the telescopic rod as a unit, pressure means to raise the ring to strip the tire from the lower mold section, said last named pressure means being reversible to strip the diaphragm from one side of the tire, the raising of the expansible rod as a unit and the extension of the rod by fluid pressure stripping the diaphragm from the other side of the tire.

27. In a tire shaping and vulcanizing press having upper and lower mold sections, a diaphragm and means for manipulating the diaphragm during the closing of the press comprising a closure plate attached to the upper edge of the diaphragm and located in the path of the upper mold section during closing of the press, a ring attached to the lower edge of the diaphragm, a telescopic rod connected to the closure plate, means operated by the closure of the press to lower the rod for a limited distance before the upper mold section strikes the closure plate, and fluid pressure means acting upon the rod to offer a yielding resistance to the closing movement of the upper mold section.

28. In a tire shaping and vulcanizing press having upper and lower mold sections, a diaphragm and means for manipulating the diaphragm during the closing of the press comprising a closure plate attached to the upper edge of the diaphragm and located in the path of the upper mold section during closing of the press, a ring attached to the lower edge of the diaphragm, a telescopic rod connected to the closure plate, means operated by the closure of the press to lower the rod for a limited distance before the upper mold section strikes the closure plate, fluid pressure means acting upon the rod to offer a yielding resistance to the closing movement of the upper mold section, and means to admit fluid pressure to the interior of the diaphragm after the upper mold section has contacted the closure plate.

29. In a press for shaping and vulcanizing a tire band, a pair of mold sections movable into contact with each other to form a tire molding cavity, a diaphragm between the mold sections about which the unvulcanized band is placed with the upper edge of the diaphragm in the path of the movable mold section, means to impart a preliminary contraction to the diaphragm before the movable mold section contacts the edge thereof, and means to support the upper edge of the diaphragm yieldingly against the approach of the movable mold section and to allow the movable mold section to shape the tire band and the diaphragm during the balance of the mold closing operation.

30. In a press for shaping and vulcanizing tire bands, mating mold sections movable toward one another during the closing of the press, a diaphragm located between the mold sections, means to inflate the diaphragm, a telescoping shaft attached to the upper edge of the diaphragm, means to lower the upper end of the telescoping shaft to reduce the height of the diaphragm before the diaphragm is inflated, and means operative thereafter to telescope the shaft upon itself during the closing of the press and the shaping of the tire band.

31. In a press for shaping and vulcanizing tire bands, a diaphragm, a closure attached to the lower edge of the diaphragm, a second closure attached to the upper edge of the diaphragm, a telescoping shaft attached to and supporting the second closure, means to lower the second closure to reduce the height of the diaphragm, and additional means to telescope the shaft upon itself during the closing of the press and the shaping of the tire band.

References Cited in the file of this patent

UNITED STATES PATENTS

| | | |
|---|---|---|
| 2,243,532 | Maynard | May 27, 1941 |
| 2,495,664 | Soderquist | Jan. 24, 1950 |
| 2,559,119 | Frank | July 3, 1951 |